United States Patent [19]

Melchior et al.

[11] Patent Number: 4,483,150
[45] Date of Patent: Nov. 20, 1984

[54] SUPERCHARGED INTERNAL COMBUSTION ENGINES PROVIDED WITH A COOLING SYSTEM

[75] Inventors: Jean Melchior; Thierry Andre, both of Paris, France

[73] Assignee: Societe pour le Developpement de la Suralimentation HYPERBAR, Trappes, France

[21] Appl. No.: 470,568

[22] Filed: Feb. 28, 1983

[51] Int. Cl.³ ............................................. F02B 29/04
[52] U.S. Cl. ........................................................ 60/599
[58] Field of Search .............. 123/41.56, 41.58, 41.59, 123/563, 564, 559; 60/599, 600, 604, 605, 611

[56] References Cited
U.S. PATENT DOCUMENTS 3,712,282  1/1973  Isley .................................... 123/563
4,077,219  3/1978  Melchior et al. ...................... 60/599
4,122,679  10/1978  Charron ............................. 123/552
4,125,999  11/1978  Melchior ............................ 60/606

Primary Examiner—William A. Cuchlinski, Jr.
Attorney, Agent, or Firm—Barnes, Kisselle, Raisch, Choate, Whittemore & Hulbert

[57] ABSTRACT

An air-to-air radiator is inserted in the circuit of the supercharging compressor of an engine. A turbine which is driven by the exhaust gases of the engine drives the compressor. A regenerator, through which the gases issuing from the turbine pass, is placed in an air circuit connecting the compressor to the motor. The air circuit of the radiator is connected in parallel with the air circuit of the regenerator and a directional valve device is adapted to open one of these air circuits while closing the other and vice versa.

8 Claims, 4 Drawing Figures

SUPERCHARGED INTERNAL COMBUSTION ENGINES PROVIDED WITH A COOLING SYSTEM

The invention relates to internal combustion engines, and preferably Diesel engines, which are supercharged by a turbocharger comprising at least one compressor and at least one turbine driving this compressor and which are provided, on one hand, with a cooling heat exchanger, namely an air-to-air radiator, in the air circuit connecting the compressor to the intake of the engine and, on the other hand, with a regenerator having an air circuit and a gas circuit, which gas circuit communicates on the upstream side with the outlet of the turbine and on the downstream side with the atmosphere.

Such an engine is described in the U.K. Pat. No. 433,630 (George RODDAM).

When the engine operates at high power, it is known that the air leaving the compressor must be cooled before it enters the engine. The cooling radiator operates in a satisfactory manner when the load and the speed of the engine are not subjected to sudden variations.

Taking for example an engine developing 1000 H.P. at 2000 rpm; having a capacity of 27 liters and operating under the following conditions;

engine air: 1.5 kg/s at 3 bars (absolute);
ambient air: 0° C.;
temperature of the air at the outlet of the compressor: 200° C.;
temperature of the air at the intake of the engine: 60° C. The thermometric efficiency of the radiator is then $$\eta_{th} = \frac{200 - 60}{200 - 0} = 0.70$$

Let it be assumed that the engine is unloaded and brought back to low speed, for example for changing gear with the gearbox coupled to the output shaft of the engine. The speed of the turbocharger unit drops and the pressure ratio of the compressor tends toward 1. Consequently, the mass flow of the air aspirated by the engine decreases owing to:

the reduction of the speed of the engine, for example from 2000 to 500 rpm,
and the drop in the pressure ratio of from 3 to 1.

In this case, the mass flow of the air passing through the engine is reduced in the ratio of 1 to 12 and becomes:

$$1.5 \text{ kg/s} \times \frac{1}{3} \times \frac{500}{2000} = 0.125 \text{ kg/s}.$$

As is clear from FIG. 1, where there have been plotted as abcissae, the supercharging air flow Q in kg/s, and as ordinates, the thermometric efficiency $\eta$th of the radiator, this thermometric efficiency tends toward 1.

If, under these conditions, the engine being suddenly unloaded, the ventilation of the radiator continues to operate owing to its inertia, which is the case for example if a fan associated with the radiator is driven either by the supercharged engine through a hydrostatic transmission, or by an electric motor (even after the interruption of the supply current), the temperature of the supercharging air then becomes substantially equal to the ambient temperature. In the example mentioned, the engine will aspirate cold air at 0° C.

When regaining speed (selection of a new gear ratio of the gearbox) the engine will stall or at any rate will operate in a disorderly manner and send through the exhaust a large amount of unburnt substances (white smoke). In other words, if it does not stall, the engine no longer regains speed and is highly pollutant.

An object of the invention is to provide an internal combustion engine fed through a turbocharger unit and equipped with an air-to-air radiator in the air circuit connecting the compressor of the turbocharger unit to the intake of the engine, the operation of which is not disturbed by sudden decreases in the load and speed.

The invention therefore provides an internal combustion engine and preferably a Diesel engine of the type which is supercharged by a turbocharger unit comprising at least one compressor and at least one turbine driving said compressor and which is provided, on one hand, with a cooling heat exchanger in the air circuit connecting the outlet of the compressor to the intake of the engine and, on the other hand, with a regenerator having an air circuit and a gas circuit, which gas circuit communicates on the upstream side with the outlet of the turbine and on the downstream side with the atmosphere, the cooling heat exchanger having its air circuit disposed in parallel with the air circuit of the regenerator and directional valve means, disposed at the junction of the two air circuits, being adapted to open the air circuit of the regenerator while closing the air circuit of the cooling heat exchanger and vice versa, which directional valve means are actuated by a control responsive to the temperature of the air in the intake manifold of the engine and adpated to put said directional valve means in the position for closing the air circuit of the regenerator as soon as the temperature of the air in said intake manifold exceeds a given temperature threshold.

Such an engine is described for example in the U.S. Pat. No. 4,122,679 (Francis CHARRON) and more particularly illustrated in FIG. 9 of this patent. In this case, the cooling heat exchanger (16) is not an air-to-air radiator and the drawbacks mentioned hereinbefore of the prior art do not exist. Further, said directional valve means are responsive thereto solely at the temperature of the intake air.

In order to achieve the aforementioned object, the internal combustion engine of the type defined hereinbefore is characterized in that the cooling heat exchanger is an air-to-air radiator and said control is responsive to the supercharging pressure and adapted to put the directional valve means in the position for opening the air circuit of the regenerator as soon as the supercharging pressure drops below a given threshold pressure.

As will be explained in more detail hereinafter, such an engine overcomes the drawbacks of the prior art.

According to an advantageous construction, the directional valve means comprise two closure elements which are respectively inserted in the air circuit of the regenerator and in the air circuit of the air-to-air radiator and are so combined that one opens when the other closes and vice versa.

Lastly, when the turbocharger unit has several stages, the gas circuit of the regenerator is usually interposed between the outlet of the high pressure turbine of the turbocharger unit and the inlet of the low pressure turbine of this unit.

The invention will now be described in more detail with reference to the accompanying drawings:

FIG. 1, which was referred to hereinbefore, illustrates the drawbacks of known engines.

Figure 2:
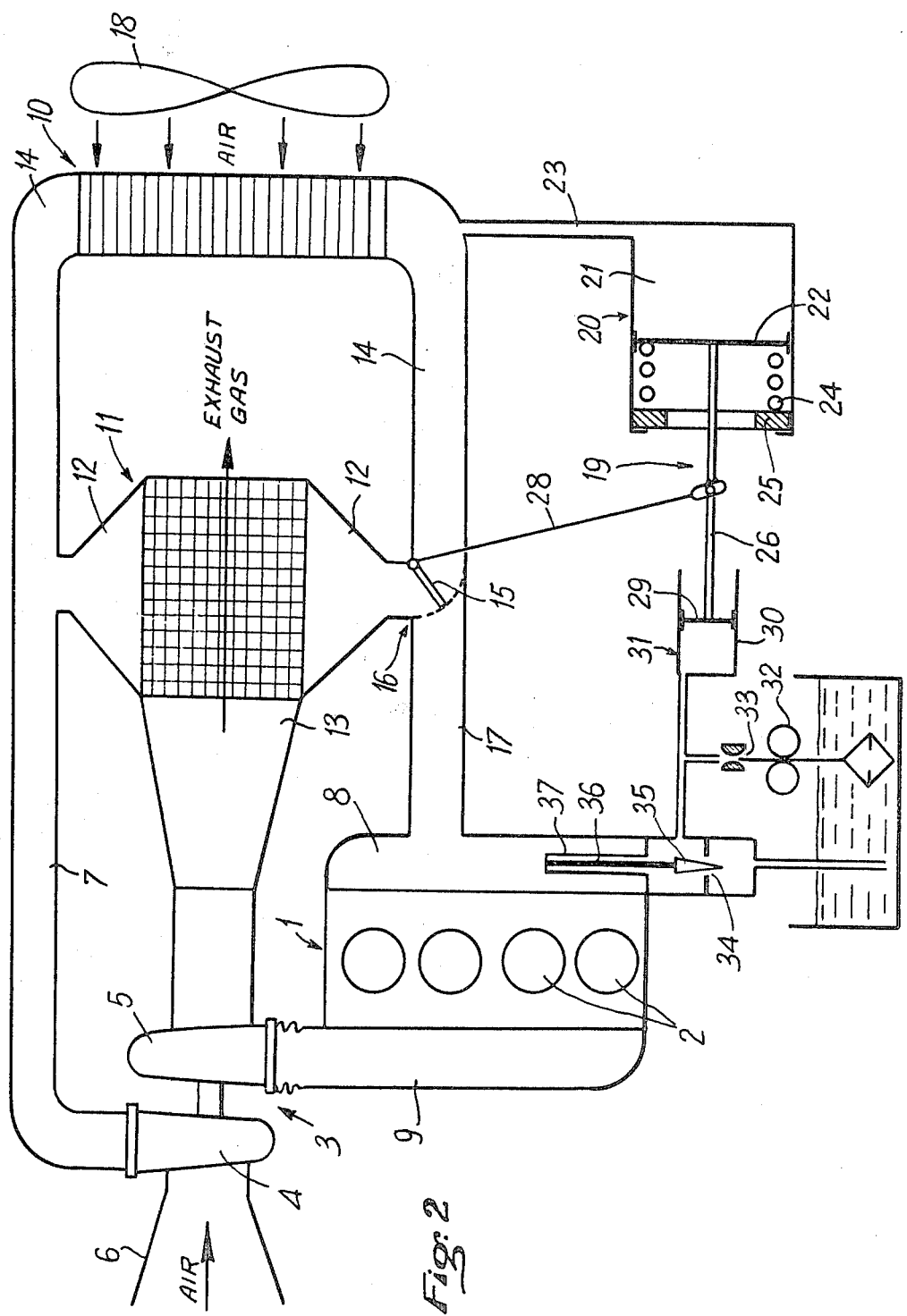
FIG. 2 is a schematic of the principle of operation of an engine according to the invention.

FIG. 2 represents a Diesel engine 1 for example having four cylinders 2 which is supercharged by a turbocharger unit 3 comprising a compressor 4 and a turbine 5 driving this compressor 4. The compressor 4 is provided with an air inlet pipe 6 and an air discharge pipe 7. The engine 1 has an intake manifold 8 which the discharge pipe 7 is connected to in a manner which will be explained hereinafter and an exhaust manifold 9 which leads to the inlet of the turbine 5.

The engine 1 is provided, on one hand, with a cooling heat exchanger 10 in the air circuit connecting the discharge pipe 7 of the compressor 4 to the intake manifold 8 of the engine 1 and, on the other hand, with a regenerator 11 having an air circuit 12 and a gas circuit 13. This gas circuit communicates, on the upstream side, with the outlet of the turbine 5 and, on the downstream side, with the atmosphere. As is known, a regenerator is a heat exchanger adapted to take heat from the exhaust gases of an engine and to give it up to the air or a carbureted mixture which enters the engine.

The cooling heat exchanger 10 comprises an air-to-air radiator whose circuit of air to be cooled 14 is connected in parallel with the air circuit 12 of the regenerator 11 and a directional valve means 15, disposed at the junction 16 of the two air circuits 14, 12, is adapted to open the air circuit 12 of the regenerator 11 while closing the circuit of the air to be cooled 14 of the radiator 10 and, vice versa, to close the air circuit 12 of the regenerator 11 while opening the circuit for the air to be cooled 14 of the radiator 10.

In other words, the discharge pipe 7 of the compressor 4 is divided into two branches, 12 and 14, which constitute respectively the air circuit of the regenerator 11 and the air cooling circuit of the radiator 10 and which are re-united at 16, downstream of the exchangers 10 and 11, into a common pipe 17 which leads to the intake manifold 8.

Preferably, the radiator 10 has a forced ventilation owing to the presence of at least one fan 18 driven in the manner indicated hereinbefore. The current of air created by this fan 18 has been diagrammatically represented in FIG. 2 by parallel arrows.

The directional valve means 15, which is diagrammatically represented by a flap in FIG. 2, moves between two extreme positions: a first position (in which the flap 15 would be placed horizontally in FIG. 2) which is the normal position: thus the air circuit 12 of the regenerator 11 is closed while the air circuit 14 of the radiator 10 in open; and a second position (in which the flap 15 would be placed vertically) which is the position for heating the air supplied to the engine 1: the air circuit 12 of the regenerator 11 is open while the air circuit 14 of the radiator 10 is closed.

As shown diagrammatically in FIG. 2, the directional valve means 15 may occupy positions intermediate between these two extreme positions. The directional valve means 15 is subjected to an automatic control 19 which is responsive to the load of the engine 1 through the medium of the supercharging pressure and the temperature of the intake air of the engine and possibly to the flow of fuel introduced in the cylinders 2 of the engine 1 (measured for example by the position of the rack of the injection pump feeding this engine 1 in the most frequent case when it concerns a Diesel engine).

In addition to the aforementioned parameters representing the load of the engine 1, it is possible to cause the position of the directional valve means 15 to be also responsive to the ambient temperature and possibly to the temperature of the cooling liquid of the engine.

As shown diagrammatically in FIG. 2, the automatic control 19 may comprise a pneumatic cylinder device 20 having a fixed cylinder 21 and a moving piston 22. On one of its sides, the piston 22 is subjected to the pressure of the supercharging air transmitted thereto by way of a pipe 23. The piston 22 is also subjected to the action of a return spring 24, this action being for example adjusted by means of calibrating shims 25 of variable thicknesses. The piston 22 is coupled to a lever 28 actuating the flap 15 through its piston rod 26.

Such a control 19, which is rendered responsive to the load of the engine 1 through the medium of the supercharging pressure, has its action modulated as a function of the intake temperature of the engine.

For this purpose, there is made to act upon the rod 26 of the piston 22 of the pneumatic cylinder device 20 a second piston 29 which has a fixed cylinder 30 and constitutes a hydraulic cylinder device 31. A hydraulic pump 32 feeds liquid to the cylinder 30 of the cylinder device 31 through a fixed nozzle or jet 33. In order to detect the intake temperature, the pump 32 is made to discharge through a leakage orifice 34 whose free section is regulated by a needle 35; the non-expansible rod 36 of this needle 35 is connected to an expansible sleeve 37 which is placed in the intake manifold 8. The higher the temperature prevailing in the manifold, the larger the free section of the orifice 34 and consequently the lower the pressure exerted on the piston 29. The threshold temperature is adjustable owing to the adjustment (for example by means of shims) of the distance between the needle 35 and the seat of the orifice 34 at a reference temperature.

Such a control 19 operates in the following manner;

In normal operation, the supercharging pressure transmitted to the piston 22 is sufficient to overcome the resistance of the spring 24 and the flap 15 occupies its normal pistion (horizontal in FIG. 2). The radiator 10 operates normally in cooperation with fan 18. The hot gases issuing from the turbine 5 pass through the regenerator 11: the metallic mass of the regenerator 11 is brought to for example 400° C.

Operatiing at low power (low speed and/or low load) and this all the more so as the ambient temperature (or possibly the temperature of the cooling liquid of the engine 1) is lower, the supercharging pressure transmitted to the piston 22 decreases and the flap 15 then occupies either and the second extreme position (vertical in FIG. 2) or an intermediate position such as that shown by way of example in FIG. 2.

Owing to this arrangement, the operation of the engine 1 at low power may be improved:

either in transitional operation (when changing the speed of the gearbox for example): the directional valve means occupies its second extreme position and the hot mass of the regenerator 11 heats the air sent to the engine: the defect explained hereinbefore completely disappears;

or in stationary operation (operation under no load for a prolonged period of an electric generator driven by the engine 1, cruising operation of a ship whose propellor or propellors are driven by this engine): the direction valve means 15 occupies an intermediate position and, by mixture between the partial air flows in the circuits 12 and 14, maintains in the intake manifold 8 an acceptable temperature, in particular for the self-ignition when it concerns a Diesel engine.

The control 19 shown in FIG. 2 has a double action, namely a pneumatic action (cylinder device 20) and a thermostatic action (cylinder device 31).

As soon as the supercharging pressure drops below a certain pressure threshold (of the order of 1.1 bar Abs for example, which is adjustable by means of the shims 25) the spring 24 biases the flap 15 to its second extreme position (vertical).

Owing to the thremostatic sleeve detector 37, the pressure in the hydraulic cylinder device 31 is established as soon as the temperature in the intake manifold 8 drops below a given temperature threshold (for example 40° C.) Above this threshold, the hydraulic pressure exerted on the piston 29 drops to zero; the pneumatic cylinder device 20 is alone operative. Below this threshold, the hydraulic pressure increases with decrease in temperature which opens correspondingly the air outlet of the regenerator 11 and increases the temperature of the intake air.

According to a first modification, it is possible to combine with the control 19 any system or servo control (hydraulic, mechanical, electrical, or electronic) which causes the intervention of at least the supercharging pressure and the temperature of the intake air among the aforementioned parameters.

Figure 1:
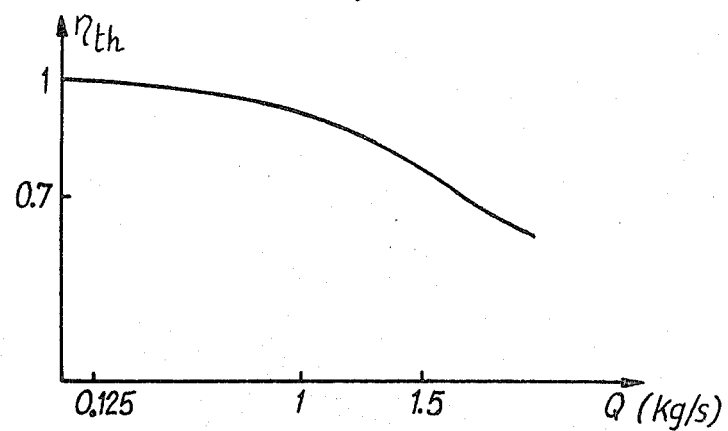
Figure 3:
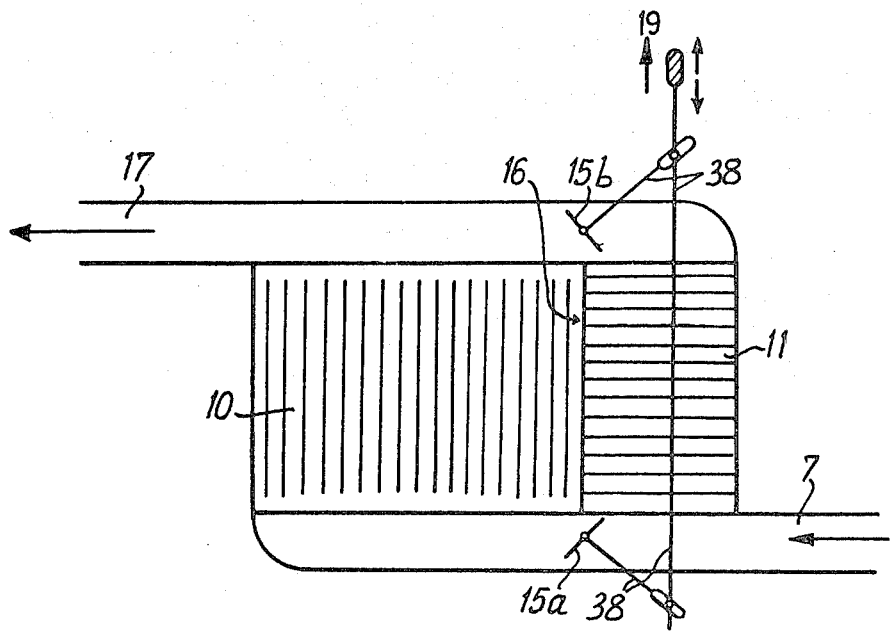
FIG. 3 represents a modification of a part of the engine of FIG. 2.

According to a second modification, the directional valve means according to the invention may be formed not by a single flap 15 (FIG. 2), but by any other equivalent means and in particular by two flaps (butterflies or other means) directly or indirectly connected to a common control such as 19. Thus, according to the modification diagrammatically shown in FIG. 3, the single flap 15 of FIG. 2 is replaced by two flaps 15a, 15b which are placed respectively between the inlet of the air circuit of the radiator 10 and the inlet of the circuit of the regenerator 11 and between the outlet of the air circuit of the radiator 10 and the outlet of the air circuit of the regenerator 11. These two flaps 15a and 15b are combined, for example by a linkage 38, so that one of them opens when the other closes. A control similar to the control 19 of FIG. 2 acts on this linkage 38. The air-to-air radiator 10 and the air-to-gas regenerator 11 are disposed side by side, which renders the construction more compact and facilitates their connections with the discharge pipe 7 and the common pipe 17.

Such a modification permits independent adjustments for the two flaps 15a and 15b, with in particular a possibility of phase shifts between their respective movements.

Although the invention has been described in the case of a Diesel engine 1 having a high effective mean pressure or otherwise (preferably having a low volumetric ratio), it can concern just as well an engine having a controlled ignition.

Figure 4:
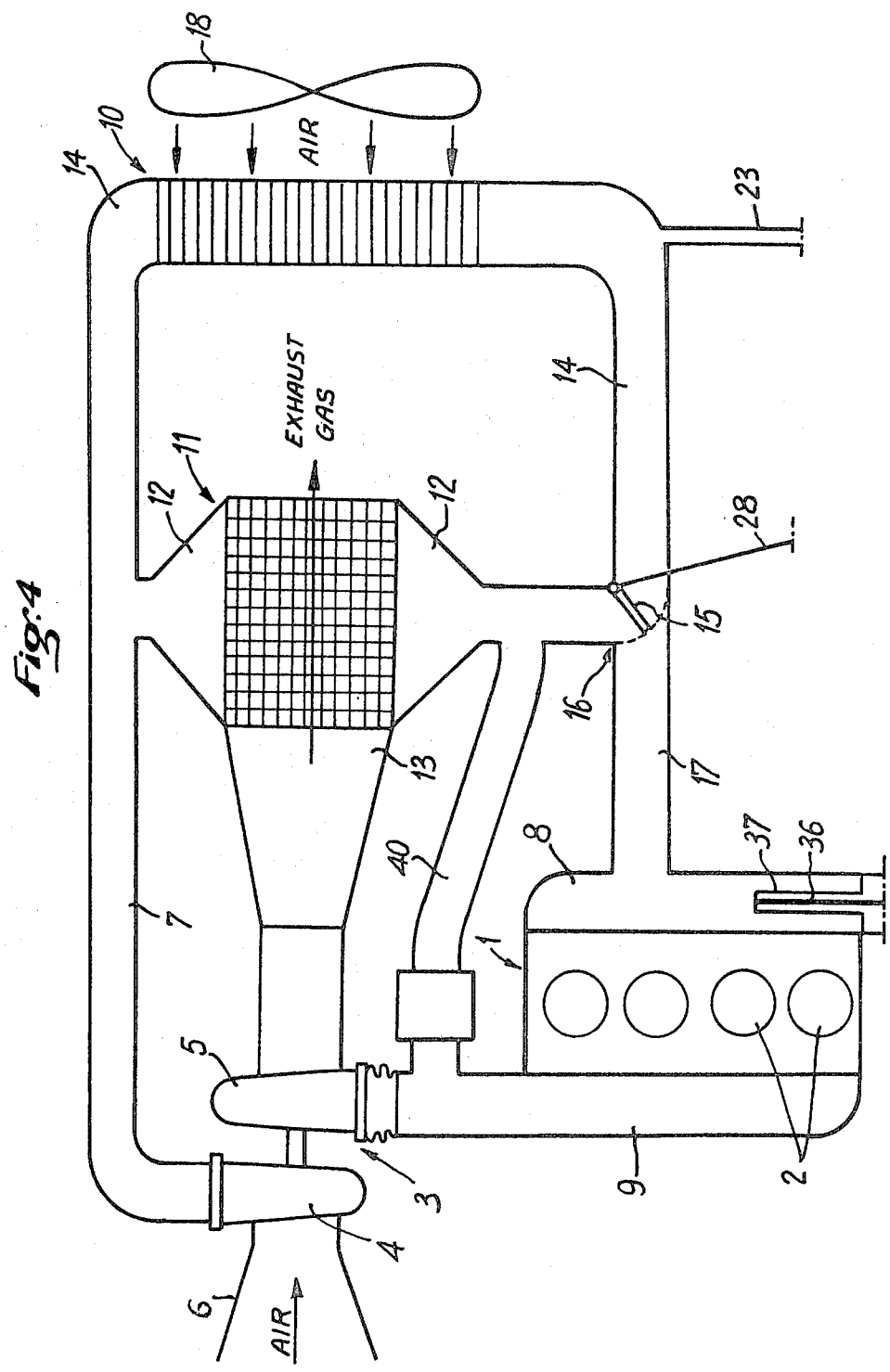
FIG. 4 is a diagrammatic view of an engine designed in accordance with a modification of the embodiment of FIG. 2.

Further, the invention is applicable to the case where, as shown in FIG. 4, a branch pipe 40 which is or is not provided with an auxiliary combustion chamber 41, connects the outlet of the compressor 4 to the inlet of the turbine 5 in by-passing the engine 1. Such an engine is described and claimed in the U.S. Pat. No. 4,125,999 which is herein incorporated by reference. In this case, such a branch pipe 40 would lead from a region of the air circuit 12 of the regenerator 11 located between the downstream side of this regenerator 11 and the junction 16 and would lead in the known manner to the inlet of the turbine 5.

Likewise, although the turbocharger unit 3 has been shown to have only a single stage, it may concern a unit having a plurality of stages. In this case, the gas circuit 13 of the regenerator is interposed between the outlet of the high pressure turbine of the turbocharger 3 and the inlet of the low pressure turbine of this unit.

Having now described my invention, which I claim as new and desire to secure by Letters Patent is:

1. In an internal combustion engine having an intake manifold, a turbocharger unit for supercharging the engine and comprising at least one compressor and at least one turbine drivingly connected to said compressor, the engine being provided with a cooling heat exchanger in an air circuit connecting an outlet of the compressor to the intake of the engine and with a regenerator having an air circuit and a gas circuit, which gas circuit communicates on an upstream side with an outlet of the turbine and on a downstream side with the atmosphere, the cooling heat exchanger having an air circuit connected in parallel with the air circuit of the regenerator, and directional valve means disposed at a junction of the two air circuits and adapted to open the air circuit of the regenerator while closing the air circuit of the cooling heat exchanger and vice versa, a control operatively connected to said directional valve means, the control being responsive to the temperature of the air in the intake manifold of the engine and being adapted to put said directional valve means in a position for closing the air circuit of the regenerator as soon as the temperature of the air in said intake manifold exceeds a given temperature threshold; the improvement wherein the cooling heat exchanger is an air-to-air radiator and the control is responsive to the supercharging pressure and adapted to put the directional valve means in the position for opening the air circuit of the regenerator as soon as the supercharging pressure drops below a given threshold pressure.

2. An internal combustion engine according to claim 1, wherein the air-to-air radiator is combined with means for creating a forced ventilation thereof.

3. An internal combustion engine according to claim 2, wherein the directional valve means comprise two closure elements which are respectively inserted in the air circuit of the regenerator and in the air circuit of the air-to-air radiator and are so combined that one opens when the other closes and vice versa.

4. An internal combustion engine according to claim 2, the turbocharger unit of which has a plurality of stages and comprises a low pressure turbine and a low pressure compressor and a high pressure turbine and a high pressure compressor, the gas circuit of the regenerator being interposed between the outlet of the high pressure turbine and the inlet of the low pressure turbine.

5. An internal combustion engine according to claim 1, wherein the directional valve means comprise two closure elements which are respectively inserted in the air circuit of the regenerator and in the air circuit of the air-to-air radiator and are so combined that one opens when the other closes and vice versa.

6. An internal combustion engine according to claim 1, the turbocharger unit of which has a plurality of stages and comprises a low pressure turbine and a low pressure compressor and a high pressure turbine and a high pressure compressor, the gas circuit of the regenerator being interposed between the outlet of the high pressure turbine and the inlet of the low pressure turbine.

7. An internal combustion engine according to claim 1, wherein an air branch pipe by-passing the engine extends from a region of the air circuit of the regenerator located between a downstream side of said regenerator and said junction and leads to the inlet of the turbine.

8. An internal combustion engine according to claims 1, 2, 5, 6, 7, 3 or 4 wherein said engine comprises a Diesel engine.

* * * * *